United States Patent
Mc Cartney

[11] 3,914,015
[45] Oct. 21, 1975

[54] FIBER OPTIC CONNECTOR AND ASSEMBLY METHOD

[75] Inventor: Ronald L. Mc Cartney, Orange, Calif.

[73] Assignee: International Telephone and Telegraph Corporation, New York, N.Y.

[22] Filed: Oct. 15, 1974

[21] Appl. No.: 514,820

[52] U.S. Cl. ........ 350/96 C; 350/96 B; 350/96 WG
[51] Int. Cl.² .......................................... G02B 5/14
[58] Field of Search............ 350/96 B, 96 C, 96 WG

[56] References Cited
UNITED STATES PATENTS
3,455,625   7/1969   Brumley et al.................... 350/96 C OTHER PUBLICATIONS
Thiel et al., "In-Line Connectors for Multimode Optical Waveguide Bundles," *Applied Optics*, Vol. 13, No. 2, Feb. 1974, pp. 240-242.

*Primary Examiner*—James B. Mullins
*Attorney, Agent, or Firm*—Thomas L. Peterson

[57] ABSTRACT

A connector for a single fiber optic bundle in which the fiber optic cable ends to be connected are each terminated in a shrinkable metal sleeve or pin. A shrinkable alloy, such as 50% nickel and 50% titanium alloy, is employed. The shrinkable pin has an inside axial bore of hexagonal cross-section and is applied to the fiber optic bundle cold. An applied heating process step shrinks the pin about the fiber optic bundle and applies a force sufficient to constrain the individual glass fibers into an optimum hexagonal pattern in which the ratio glass fiber cross-sectional area within the said hexagon to the effective cross-sectional area of intervening voids is high. After the heating process is complete, and the assembly cools to ambient temperature, there is some relief of the shrink compressive force, however, the fibers remain in their optimum hexagonal cross sectional configuration. Adhesives and resins such as epoxy are relied upon to mechanically fix the fibers of the cable within the termination pin.

9 Claims, 4 Drawing Figures

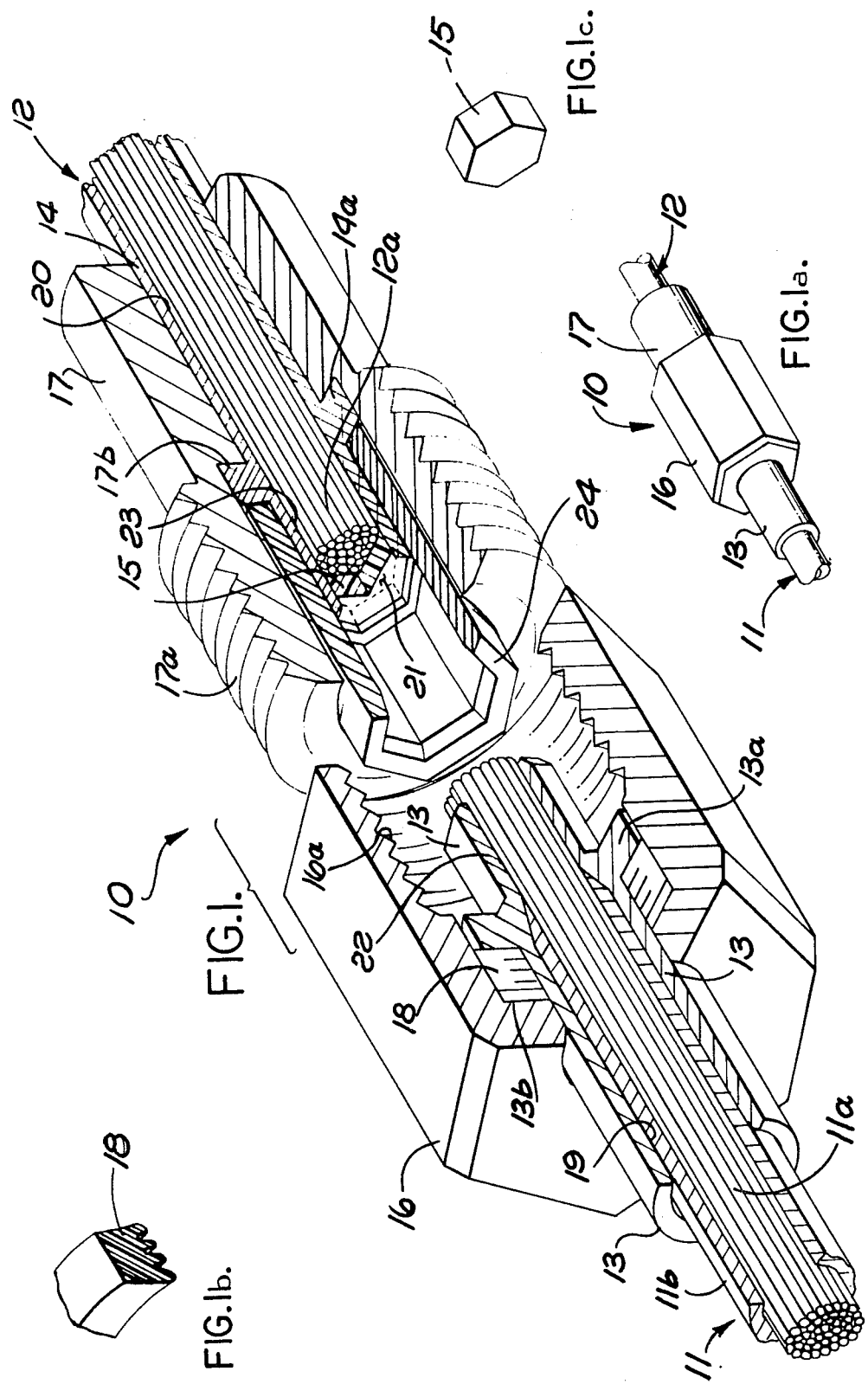

FIBER OPTIC CONNECTOR AND ASSEMBLY METHOD

BACKGROUND OF THE INVENTION

1. Field of the Invention

The invention relates to connectors for fiber optic cables, especially multi-fiber optical cables.

2. Description of the Prior Art

The employment of fiber optic cables or light guides, also sometimes referred to as optical communication fibers, for the transmission of information-bearing light signals, is now an established art. Much development work has been devoted to the provision of practical low-loss glass materials and production techniques for producing glass fiber cables with protective outer coatings or jackets. The jacket makes them resemble ordinary metallic-core electrical cable upon superficial external inspection. Obviously, if fiber optic cables are to be used in practical signal transmission and processing systems, practical connectors for the connection and disconnection of fiber optic cables must be provided.

Before the prior art in respect to connectors, per se, is discussed, some references will be given for the benefit of the skilled reader in understanding the state of fiber optic art in general.

An article entitled "Fiber Optics" by Narinder S. Kapany, published in the SCIENTIFIC AMERICAN, Vol. 203, Pages 72 – 81, dated November 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or offset, are among the factors effecting the light transfer efficiency at a connector. In this connection, attention is directed to the Bell System Technical Journal, Vol. 50, No. 10, December 1971, specifically to an article by D. L. Bisbee, entitled "Measurement of Loss Due To Offset, and End Separations of Optical Fibers." Another Bell System Technical Journal article of interest appeared in Vol. 52, No. 8, October 1973 and was entitled "Effect of Misalignments on Coupling Efficiency on Single-Mode Optical Fiber Butt Joints" by J. S. Cook, W. L. Mammel and R. J. Grow.

The patent literature also contains much information relative to the state of this art. For example, U.S. Pat. No. 3,624,816 describes a "Flexible Fiber Optic Conduit." The device described therein uses a plurality of light conducting fibers in a flexible cable type arrangement.

Concerning the utility of fiber optic cables and therefore the utility of connectors for such cables, various systems are described in the patent literature which employ fiber optic cables. One example of such a utilization system is described in U.S. Pat. No. 3,809,908.

Yet another patent of interest is entitled "Glass Fiber Optical Devices", U.S. Pat. No. 3,589,793. That reference relates to the fiber optic bundles and the glass fibers themselves, as well as to a method of fabrication for the fiber optic elements themselves.

A selection of U.S. patents relating more particularly to optical cable connectors includes U.S. Pat. Nos. 3,790,791; 3,734,594; 3,637,284; 3,572,891; 3,806,225; 3,758,189 and 3,508,807 are representative of the connector prior art.

The so-called "crimp sleeve" has been applied as a device for compressing and holding the glass fibers at the end of a fiber optic cable, however, this and the other prior art methods all suffer from peculiar disadvantages. It is known that, in a fiber optic bundle, it is very desirable to compress the fibers as close together as possible, so that the unused, or void area between fibers, is reduced to a minimum. Whatever connector arrangement is employed to dismountably join two fiber optic cables, the light-loss at transfer from end surface to end surface is the least when these voids between fibers are reduced as much as possible. Crimping procedures have been applied and terminations pins having hexgonal bores have been employed in the prior art in an effort to address this problem. Crimping devices tend to fracture the glass fibers of the optical cable. The slide fitting of the optic fiber bundle into a hexagonal bore requires that provision be made for tolerances. The resistance to insertion must be held within practical limits, and therefore, the hexagonal sleeve or hollow end pin, although relatively efficient as a natural cross-section configuration, necessarily permits more than optimum void space between fibers. That is to say, the ratio of the cross-sectional area or sum of the cross-sectional areas of the individual glass fibers to the area of the voids between is not high enough to minimize connection light-loss.

The use of a shrinkable metal sleeve for interconnection of hydraulic tubing lines is known, but is not known in the fiber optic connector art. Shrinkable plastics have also found use, especially in electric cable splicing.

In shrinkable metal applications, the terms cool and hot are relative. Hot, in this context, may not be more than average ambient temperature, and cool may be nearly as cold as absolute zero. Usually, the greatest tensile force is achieved at a processing temperature in excess of ambient, and in applications in which the shrink force is relied upon to forcibly hold a component in position, there is a problem of relaxation of the metal, possibly unsealing the connection it is intended to maintain.

In hydraulic line joining by the shrink-sleeve technique, the sleeve parts may be held at liquid nitrogen temperature and field formed before application. This procedure is both cumbersome and expensive.

The manner in which the present invention deals with the problems of the prior art to provide a unique solution will be understood as this description proceeds.

SUMMARY OF THE INVENTION

The present invention concerns a fiber optic cable connector and cable fiber terminating pin for use in a connector assembly comprising a single fiber optic circuit connection between the multiple fiber bundles of a connectable pair of cables. The concepts of the present invention are particularly practical for fiber optic cables having individual fibers of diameter in the 10 to 25 micron range.

The terminating pin must hold the fiber bundle effectively and must constrain the fibers into a predetermined cross-sectional pattern (such as a hexagon). The present invention produces the latter effect, but is combined with an adhesive to accomplish the required permanent mechanical bond.

The pin assembly, according to the present invention, includes a hollow body elongated to form a hollow terminating pin, having a first axial hexagonal bore therein which accommodates the fiber optic bundle in a circumferentially compressed condition and a second bore over much of the remaining axial length of the pin body. This second bore has a diameter large enough to accommodate the outer jacket of a fiber optic cable. In the region of conjunction of these two axial bores, there is a cavity section of generally truncated conical shape having substantially the cross-sectional area of the first bore at one end and that of the second bore at the other end.

The optical fiber is prepared with a predetermined amount of the fiber bundle exposed by removing the jacket for that predetermined length. This cable end is then inserted through the second bore and then through the first bore. In the fully inserted condition, the jacketed portion of the cable inserted into the pin body occupies substantially the entire second bore length and the unjacketed fiber optic bundle occupies the length of the first bore, plus the frusto-conical transition section. The aforementioned transition section affords a space for the introduction of expoxy resin or some other suitable known potting material. In connection with the present invention, the hollow pin body preferably has an adhesive film about its inside walls and the bonding of the pin to the fibers and cable jacket is also achieved during the shrinking process.

A detailed description of a typical embodiment of the present invention follows.

BRIEF DESCRIPTION OF THE DRAWINGS

FIG. 1 is a partly cut-away view of a connector incorporating the present invention.

FIG. 1a is a pictorial view of the connector of FIG. 1, as seen from the outside, fully mated.

FIG. 1b illustrates a detailed view of a compression gasket used in FIG. 1.

FIG. 1c illustrates a typical shaped block of optical interface material which may be used in the combination of FIG. 1.

DESCRIPTION OF THE PREFERRED EMBODIMENT

Referring to FIG. 1, the main connector shell parts 16 and 17 are shown disconnected, but in general axial alignment as they would be preparatory to physically mating them together. Once mated, the connector as generally depicted at 10, would be seen as indicated at FIG. 1a. The cable, including jacket and fiber optic bundle, is generally represented as 11 (on the left) and 12 (on the right) in FIG. 1a, and correspondingly on FIG. 1. The optical glass fibers of 11 are 11a (on the left) and of cable 12, they are 12a (on the right). The cable jackets are as shown at 13 and 14, respectively.

The hollow terminating pins 13 and 14 are shown cemented to the jackets and glass fibers of cables 11 and 12, respectively, by corresponding adhesive films 19, 20, 22 and 23. The termination pin 13 is shown with a larger flange portion 13a than the corresponding flange portion 14a of pin 14. This is a matter of mechanical convenience only, to be evident as this description proceeds, in view of the larger outside dimensions of the shell portion 16, as compared to 17. In the case of the flange 14a, it will be noted that there is an abutment against the shoulder 17b on the part 17 and a resilient gasket ring 18 is provided between the shoulder 13b on part 13 and shoulder 16b on part 16.

It will be noted that when the connector is mated and outer shell 16 is screwed onto part 17 by engagement of thread 16a and 17a, the 11a fibers fit within the overlapping end of the termination pin containing the fibers 12a. This overlapping effect provides a chamber in which the transparent elastomer interface part 15 is contained. Even beyond part 15, there is additional overlap of the hollow pin body 14 so that the abutment (which is not a complete mechanical contact for tolerances reasons) does not fall at the transition of the fibers and the transparent interface part 15. Obviously, this particular overlap could have been provided adjacent the internal end of either the 11a or 12a optical glass fiber bundle. The transparent interface part 15 would normally have an index of refraction on the order of 1.5 consistent with the commonly used glass fibers in fiber optic cables, and for reasons well understood in this art. The part 15 is, of course, preferably of hexagonal shape in order to fit within the aforementioned overlap of the part 14 — see FIG. 1c. The part 18 also shown in FIG. 1b in an uncompressed form, provides an axial pressure tending to keep the part 13 thrusting to the right, as depicted in FIG. 1. Thus the glass fibers 11a and 12a tend to hold the interface part 15 under a certain amount of compression. This and the alignment sleeve 24 influence the quality of light transfer at this interface, that is, they enable light transfer with relatively low-loss.

The method of emplacing the hollow termination pins on the ends of the glass fibers of the respective cable ends includes the use of an adhesive film, such as an epoxy resin or any of a number of other suitable adhesives, as a film within the interior of the pin bodies. The adhesive thus grips the jacket 11b of the cable 11 and 12b of the cable 12 in the areas of 19 and 20, respectively, and the glass fibers 11a and 12a in the 22 and 23 areas, respectively. The heat step applied in connection with the shrinking of the termination pin body onto the cable serves also to effect curing of this adhesive.

Although the present invention is not at all limited as to the types of shrinkable materials which may be used, a 50% nickel-50% titanium alloy, sold under the tradename of "Nitinol" is suitable. After application in the cold condition, i.e., in the vicinity of 25° centrigrade, heat is applied at a temperature of approximately 75° centigrade. Warmed to this temperature, the tensile forces in the shrinkable material reach a maximum on the order of 1,000,000 psi. As previously indicated, this shrinking force constrains the optical fibers into the optimum hexagonal shape at their outer ends and for a distance adjacent thereto, and also serves to provide good adhesive contact to the optical fibers and the jacket of the cable.

Although the return of the temperature to the general range of ambient temperatures causes a relaxation in the shrinkable material tensile force (down to a value on the order of 40,000 psi) the optical fibers retain the optimum hexagonal cross-section which they have assumed prior to that time. Mechanical bonding through the adhesives is at that time substantially perfected and the cables with the now integral termination pins may be assembled into the arrangement of FIG. 1.

It should be realized that although the transparent elastomer interface part 15 or some other interface material is often used at the joint between fiber bundles to be signal connected, the present invention does not depend on its use. Actually the shrinkable termination pin according to the invention can be readily applied to a direct fiber bundle abutment arrangement, with or without an index matching gel or liquid at the interface as will be recognized once the invention is fully understood.

Obviously, the shrinkable sleeve termination pin device of the present invention can be applied separately to each fiber bundle in a multi-channel arrangement. That is, a number of such termination pins can be incorporated into a connector shell to accommodate a multi-channel arrangement, the utility of the invention therefore not being limited to a single channel configuration such as in FIG. 1(a).

Variations and modifications within the scope of the present invention will suggest themselves to those skilled in this art, once the concepts of the invention are understood. Accordingly, it is not intended that the present invention be considered to be limited by the drawings or this description, these being typical and illustrative only.

What is claimed is:

1. A fiber optic cable connector for single fiber bundles, conprising:
    first and second mateable body parts each containing a generally axial cavity for receiving a fiber optic cable with associated parts;
    first and second fiber optic cables each including a fiber optic bundle and an outer jacket;
    a hollow termination pin corresponding to each of said cables, each of said hollow pins including first and second axial bores having cross-sectional areas substantially only large enough to receive said fiber optic bundle and said outer jacket, respectively, of a corresponding fiber optic cable, said first axial bore having a polygonal configuration, said hollow pin being fabricated from shrinkable metal material whereby warming after assembly causes said hollow pins to shrink sufficient to arrange the fibers of said bundles to conform to the cross-sectional shape of said first axial bore as a consequence of the radially inwardly directed force resulting from said shrinking.

2. Apparatus according to claim 1 in which the cross-sectional shape of said first bore is generally hexagonal.

3. Apparatus according to claim 2 in which said termination pins are defined as being fabricated of a metal which is relatively soft and low in tensile strength at a temperature below a predetermined minimum ambient temperature, said metal being capable of shrinking substantially in response to application of an above ambient range temperature, the subsequent relaxation of said metal at ambient temperature not being sufficient to disturb the hexagonal cross-section of the arrangement of said fibers even though said relaxation may be sufficient to eliminate any substantial axial mechanical restraint of said fiber bundles.

4. Apparatus according to claim 3 in which said shrinkable metal is an alloy of nickel and titanium.

5. Apparatus according to claim 4 in which said nickel and titanium percentages are approximately fifty percent each.

6. Apparatus according to claim 4 in which said alloy is between forty and sixty percent nickel.

7. A fiber optic cable comprising:
    a fiber optic bundle;
    a hollow termination pin having an axial bore therein substantially only large enough to receive said fiber optic bundle, said bundle having an end portion mounted in said bore;
    said bore having a polygonal configuration; and
    said pin being fabricated from shrinkable metal material whereby warming after assembly causes said pin to shrink sufficiently to arrange the fibers of said bundle to conform to the cross-sectional configuration of said bore as a consequence of the radially inwardly directed force resulting from said shrinking.

8. A fiber optic cable as set forth in claim 7 wherein:
    said pin has a second bore therein larger in cross-section than and axially aligned with said first-mentioned bore;
    a tapered surface joining said first and second bores;
    a jacket covering said fiber optic bundle behind said end portion thereof; and
    said second bore having a cross-sectional area substantially only large enough to receive said jacket-covered portion of said bundle, said jacket-covered portion being mounted in said second bore.

9. A fiber optic cable as set forth in claim 8 wherein: the cross-sectional configuration of said first bore is generally hexagonal.

* * * * *